Sept. 18, 1945.  R. J. MILLER  2,384,953
SELF-LOCKING NUT
Filed Aug. 19, 1941

INVENTOR.
RAYMOND J. MILLER
BY
ATTORNEY

Patented Sept. 18, 1945

2,384,953

UNITED STATES PATENT OFFICE 2,384,953

SELF-LOCKING NUT

Raymond J. Miller, Detroit, Mich., assignor to American Pattern and Manufacturing Co., a copartnership consisting of said Miller and Alfred E. Wilson, Detroit, Mich.

Application August 19, 1941, Serial No. 407,469

5 Claims. (Cl. 151—19)

This invention relates to fastening devices and more particularly to self-locking nut assemblies adapted to assume a locked position on a bolt when tightened into engagement with a piece of work or a supporting surface associated with the bolt.

Considerable difficulty has been experienced in preventing threaded nuts from loosening on bolts, particularly when subjected to vibration. It has been found that if very close fits are provided between the threads of nuts and bolts the nuts will not loosen on the bolts even though subjected to severe vibration. The reason for this is that where a very close fit is provided the angularly related surfaces of the threads of the nut engage the angularly related surfaces of the threads of the bolt in such intimate contact that axial movement of the nut on the bolt is virtually eliminated.

It is impractical to manufacture nuts and bolts having such accurate thread fits as to eliminate axial movement because the cost would be prohibitive and such units would not be commercially acceptable because the nuts could not be used interchangeably on bolts.

In commercially acceptable nuts and bolts having thread fits classified as two, three or four, both angularly disposed thread surfaces of the nuts do not contact both angularly disposed thread surfaces of the bolt. Axial movement of the nut on the bolt is therefore possible, and when the nut is drawn tight against a supporting surface the threads of the nut only engage the threads of the bolt on one side referred to as the load carrying side. When such a unit is subjected to vibration the nut loosens on the bolt because the vibration periodically unloads the load carrying surfaces of the cooperating threads of the nut and bolt and the nut moves axially on the bolt and rotates on the thread to loosen.

An object of this invention is to provide a nut capable of being locked against axial movement on a bolt when tightened into engagement with a supporting surface.

A further object of the invention resides in the provision of a nut having angularly related thread surfaces adapted to intimately contact angularly related thread surfaces of a bolt to prevent axial movement of the nut on the bolt when the nut is tightened into engagement with a supporting surface.

Another object is to provide a locking nut assembly having a threaded portion capable of engaging the full diameter of the threads of a bolt when moved on the bolt to a clamping position with a supporting member.

A further object is to provide a nut having threads adapted to engage the full depth of the threads of a bolt thereby increasing the stripping strength of the threads of a given pitch.

Yet another object of the invention resides in the provision of a locking nut having axially movable portions yieldingly maintained in assembled relation and embodying commercially standard threads wherein the threads of one portion are adapted to compress radially upon axial movement of said portions relative to each other to intimately engage the threads of a bolt when the nut is rotated on the bolt into engagement with a supporting member.

Still a further object is to provide a locking nut which may be made of any desired material embodying any known thread system constructed to standard thread fits capable of withstanding severe shock vibration and hard use without loosening and which may be used over and over again without losing its locking effectiveness.

Another object of the invention resides in the provision of a self-locking nut embodying commercial grade thread fits capable of being manufactured economically and used to give accurate alignment between mating surfaces of the threads of the bolt and a portion of the nut when tightened on the bolt into engagement with a piece of work.

A further object of the invention resides in the provision of a self-locking nut capable of being economically manufactured and which automatically seals the surfaces of the nut and bolt with the material of the surface the nut engages.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawing wherein similar reference characters refer to similar parts throughout the several views.

Figure 1:
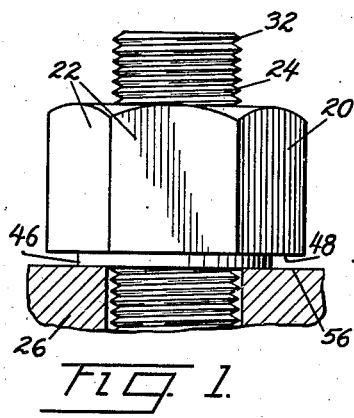
Fig. 1 is a side elevation of a locking nut and bolt embodying the present invention.
Figure 2:
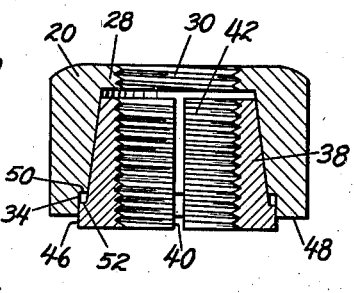
Fig. 2 is a longitudinal sectional view of the locking nut illustrated in Fig. 1.
Figure 3:
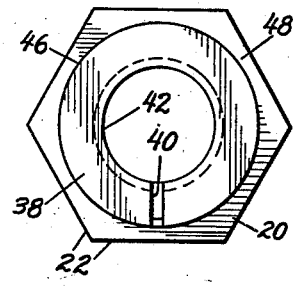
Fig. 3 is a bottom elevational view of the locking nut.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawing, it will be observed that the locking assembly comprises a nut 20 having angularly related wrench receiving surfaces 22 and is threaded on a bolt 24 projecting through one or more members or pieces of work 26 to be attached together or to be attached to another member.

As illustrated in Figs. 2 to 6, the nut 20 is preferably provided adjacent one end with a radially disposed flange 28 having axially extending threads 30 positioned to engage threads 32 formed on the bolt 24. The nut 20 is also provided with an axially extending bore 34 spaced from the threads 30. The internal surface of the nut 20 intermediate the threads 30 and the axially extending bore 34 is formed with a female tapered driving surface 36.

A bushing or sleeve 38 having an axially extending slot 40 formed by the removal of a thin strip of material (Figs. 2 and 3) is provided with internal threads 42 to engage the threads 32 of the bolt 24. It will be understood of course that the slot 40 may be in the form of a spiral or helix, if desired. The sleeve 38 is formed with a male tapered driven surface 44 preferably of the same angular inclination as the female tapered driving surface 36 of the nut 20.

The bushing or sleeve 38 is also provided with a radially disposed axially extending flange 46 adapted to be received within the axially extending bore 34 of the nut 20. The flange 46 of the sleeve 38 may be slightly larger in diameter than the bore 34 of the nut 20 to exert a yielding force thereon to maintain the sleeve in assembled relation with the nut 20.

If desired, the nut 20 may be provided with an inwardly extending shoulder 50 intermediate its axially extending bore 34 and its tapered surface 36, and the sleeve 38 may be provided with an inwardly extending shoulder 52 intermediate its tapered surface 44 and its flange 46 to increase the surface area and the frictional force exerted between the sleeve and nut.

Figure 4:
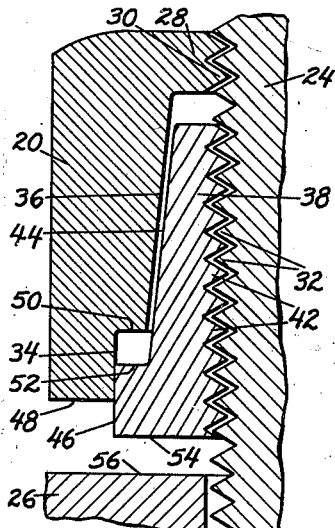
Fig. 4 is an enlarged fragmentary sectional view showing the nut threaded onto a bolt prior to actuation of the locking feature.

As illustrated in Fig. 4, the cooperating threads 30 and 42 of the nut 20 and the sleeve 38 need not be an accurate fit with the threads 32 on the bolt 24. Any commercially acceptable thread fit such for example as class two, three or four, may be employed.

The nut 20 with the sleeve 38 yieldingly held in place therein may be applied to the bolt 24 as illustrated in Fig. 4. Due to the looseness of the thread fit the frictional contact between the slightly enlarged flange 46 of the split sleeve 38 yieldingly urged into engagement with the internal surface of the bore 34 in the nut 20 is sufficient to give primary holding to rotate the sleeve 38 on the bolt 24.

If the threads 42 and 30 of the sleeve 38 and nut 20 respectively are not in proper alignment with the threads 32 of the bolt 24 at the time the threads 30 of the nut come in contact with the threads of the bolt, the nut will rotate slightly relative to the sleeve 38 and move axially thereon until its threads 30 are in proper alignment with the threads 32 of the bolt. The nut 20 may then be rotated freely on the bolt until the bottom surface 54 of the sleeve 38 engages the top or supporting surface 56 of the piece of work or member 26.

When the bottom surface 54 of the sleeve 38 engages the supporting surface 56 of the member 26 the sleeve 38 is restrained against rotation on the bolt 24. As the nut 20 continues to rotate, its threads 30 move the nut 20 axially on the sleeve 38 and force the female tapered driving surface 36 of the nut into driving engagement with the male tapered driven surface 44 of the split sleeve 38. As the nut 20 and sleeve 38 move axially relative to each other the flange 46 of the sleeve slides axially in the bore 34 of the nut.

Figure 5:
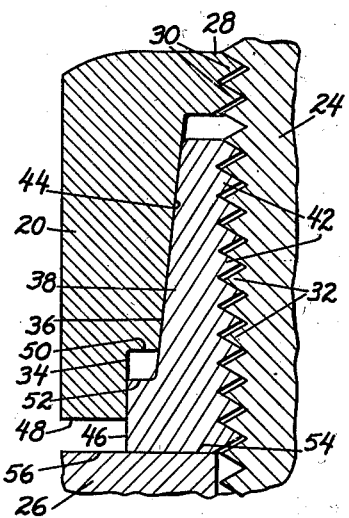
Fig. 5 is a view similar to Fig. 4 showing the nut threaded onto the bolt in an intermediate locking position.

Due to the angularity of the cooperating tapered surfaces 36 and 44 driving friction is developed which again rotates the sleeve 38 on the threads 32 of the bolt 24 to tighten the sleeve 38 against the member 26. The load carrying surfaces of the threads 42 and 30 of the sleeve 38 and nut 20 respectively are brought into contact with the load transmitting surfaces of the threads 32 of the bolt 24 as illustrated in Fig. 5.

The sleeve 38 rotates with the nut 20 to tighten on the bolt 24 until the frictional resistance to rotation developed between the threads 42 of the sleeve 38 and the threads 32 of the bolt 24 overcome the frictional driving force developed between the cooperating driving and driven tapered surfaces 36 and 44 interposed between the nut and sleeve.

It will be apparent that the frictional force developed between the threads of the sleeve and bolt may periodically overcome the frictional driving force developed between the tapered surfaces of the nut and sleeve whereupon axial movement of the nut on the sleeve caused by rotation of the nut relative to the sleeve develops increased driving friction between the tapered surfaces 36 and 44 to again rotate the sleeve 38 on the bolt to still further tighten it. It will also be apparent that rotation of the sleeve on the bolt due to the frictional force developed between the nut and sleeve results in a contraction of the sleeve about the bolt to shift the threads 42 of the sleeve 38 inwardly relative to the threads 32 of the bolt 24.

The angularity of the driving and driven tapered surfaces 36 and 44 of the nut and sleeve can be varied for different types and angles of threads as well as for various materials to develop sufficient frictional driving force to tighten the sleeve 38 on the bolt with any desired degree of tightness before slippage occurs between the nut and sleeve with no further rotation of the sleeve 38 on the bolt.

When the frictional force developed between the threads of the sleeve 38 and bolt 24 overcome the frictional force developed between the tapered surfaces 36 and 44 between the nut and sleeve, further rotation of the nut 20 moves the nut axially on the sleeve 38. This axial movement of the nut 20 on the sleeve 38 is transmitted through the tapered driving and driven surfaces 36 and 44 to contract or shrink the split sleeve 38 on the bolt 24. Contraction of the sleeve on the bolt moves the surfaces of the threads 42 of the sleeve into mating engagement with the surfaces of the threads 32 of the bolt as illustrated in Fig. 6.

Figure 6:
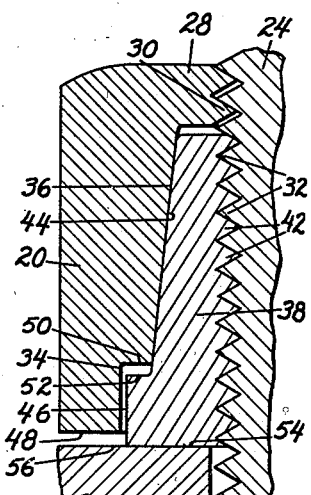
Fig. 6 is also a view similar to Fig. 4 showing the nut threaded on the bolt and in a fully locked position.

Referring to Fig. 5, it will be noted that as the sleeve 38 is contracted on the bolt 24 to the position illustrated in Fig. 6, the sleeve 38 is moved axially slightly on the bolt due to the angularity of the cooperating threads 42 and 32 of the sleeve and bolt to still further tighten the sleeve against the supporting surface. As illustrated in Fig. 6, the flange 46 of the sleeve 38 disengages the surface of the axial bore 34 in the nut when the sleeve is moved to the contracted or locked position with reference to the bolt 24.

The angular inclination of the tapered surfaces relative to the longitudinal axis of the bolt can be varied to control the applied tension which can be exerted on a supporting surface positioned to be engaged by the nut. A narrower angle of the tapered surfaces results in less force being applied to the bolt or supporting surface, and a wider angle results in greater force being applied to the bolt or supporting surface before the sleeve 38 is compressed into locking engagement with the threads of the bolt. The same result can be accomplished by varying the thickness and hence the resiliency of the sleeve 38, or by making the sleeve 38 of a more or less resilient material. It will be apparent that a plurality of sleeves 38 made of such material may be provided for use with a single nut where it is desired to vary the force exerted on a bolt or a supporting surface.

As illustrated in Fig. 6, when the sleeve 38 is in the locked position relative to the bolt 24, the angularly related surfaces of the threads 42 of the sleeve 38 engage the angularly related surfaces of the threads 32 of the bolt 24 in surface contact. Axial movement of the bolt 24 relative to the sleeve of the locking assembly is therefore prevented. Since no axial movement can occur between the bolt and sleeve, vibration or shock cannot loosen the nut on the bolt.

It will be apparent that after the nut assembly is moved to the locked position as illustrated in Fig. 6, the sleeve 38 cannot loosen on the bolt 24 unless the nut 20 is rotated in the loosening direction to release the contractible sleeve 38.

The threads 30 of the nut 20 in engagement with the threads 32 of the bolt 24 maintain an axially directed force through the cooperating tapered surfaces 36 and 44 of the nut and sleeve to maintain the sleeve in the contracted position illustrated in Fig. 6. The lower surface 48 of the nut 20 does not engage the supporting surface 56 of the member 26, and the axially extending bore 34 in the nut 20 is of sufficient length that it will not obstruct axial movement of the flange 46 upon telescoping movement of the nut 20 on the sleeve 38 to the locked position as illustrated in Fig. 6.

The nut assembly can be removed from the bolt and used over again as many times as desired. To release the nut assembly the nut 20 is merely rotated in the releasing direction. Initial axial movement of the nut 20 relative to the bolt 24 from the locked position illustrated in Fig. 6 also results in axial movement of the nut on the sleeve. The load on the driving and driven tapered surfaces 36 and 44 of the nut and sleeve is then released. The sleeve 38 therefore expands radially due to the inherent resiliency of the material of which it is formed to move its flange 46 into engagement with the inner surface of the bore 34 in the nut 20 as illustrated in Fig. 5.

As the nut 20 continues to rotate in the releasing direction the frictional force developed between the flange 46 of the sleeve 38 and the inner surface of the bore 34 of the nut 20 backs the sleeve 38 off of the bolt 24 with the nut 20. It will be understood that due to the looseness of the thread fit between the nut and sleeve on the bolt relatively little effort is required to remove the nut assembly from the bolt after the locking mechanism has been released.

The cost of manufacturing my improved locking nut is minimized, and it may be readily used in assembly production because the threads of the nut and sleeve are somewhat larger than the threads of the bolt so that close manufacturing tolerances need not be maintained, and any nut assembly of a given size can be used with any bolt of the same size.

Figure 7:
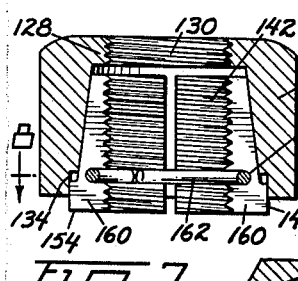
Fig. 7 is a longitudinal sectional view partly in elevation of a modified form of the invention.
Figure 8:
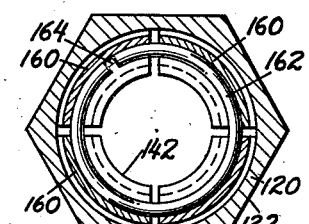
Fig. 8 is a sectional view taken substantially on the line 8—8 of Fig. 7 looking in the direction of the arrows.

The embodiment of the invention illustrated in Figs. 7 and 8 is similar in many respects to that illustrated in Figs. 1 to 6. Corresponding parts have therefore been indicated by corresponding reference numerals with the addition of 100.

It will be noted that instead of a single internal locking sleeve a plurality of locking segments 160 yieldingly urged outwardly into engagement with the internal portions of the nut 120 by a spring 162 positioned in a slot 164 may be employed.

The operation of this embodiment of the invention is substantially the same as the operation of the embodiment of Figs. 1 to 6. Springs 162 of different tension may be employed to vary the force required to move the locking segments to the fully locked position on the bolt corresponding to the position illustrated in Fig. 6 to vary the force which can be exerted on the bolt by the nut assembly.

The use of a plurality of locking segments is desirable in certain types of nut assemblies because of the ease with which such units can be assembled. It will also be apparent that it is possible to more accurately equalize the radial resiliency of the locking mechanism where a plurality of locking segments are employed than appears to be possible with a single locking sleeve. The individual segments of the locking mechanism can be positioned to lie closely adjacent each other when in the locked position on the bolt in cases where extreme accuracy of the locking mechanism or the balance thereof is required.

Figure 9:
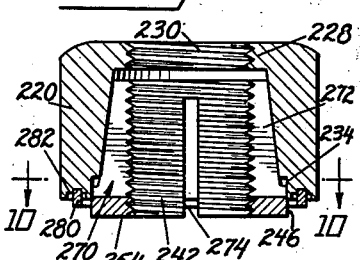
Fig. 9 is a longitudinal sectional view partly in elevation of a still further modified form of the invention.
Figure 10:
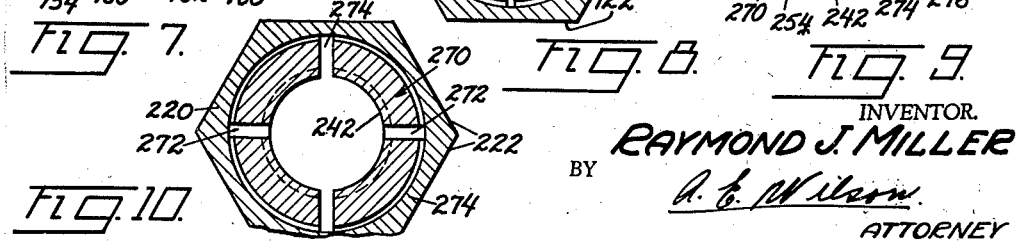
Fig. 10 is a sectional view taken substantially on the line 10—10 of Fig. 9 looking in the direction of the arrows.

Figs. 9 and 10 illustrate an embodiment of the invention wherein a sealing mechanism is employed for use where it is desired to seal the space between the bolt and the supporting surface of the member through which the bolt projects.

Many of the features disclosed in this embodiment of the invention are similar to the features discussed above in connection with the embodiment of Figs. 1 to 6. Corresponding parts have therefore been given corresponding reference numerals with the addition of 200.

A locking sleeve 270 having angularly related upwardly and downwardly extending slots 272 and 274 as viewed in Fig. 9 may be substituted for the locking sleeve 38 of the embodiment of the invention illustrated in Figs. 1 to 6. The oppositely directed slots positioned in different angularly related planes in the sleeve 270 permit opposite ends of the sleeve 270 to contract into locking engagement with the bolt upon telescoping movement of the nut 220 relative to the sleeve to shift the threads 242 of the sleeve 270 radially inwardly into locking engagement with the threads 232 of the bolt.

The unslotted portion of the sleeve 270 at the bottom of the upwardly extending slot 272 cooperates with the unslotted portion of the sleeve at the top of the downwardly extending slot 274 as viewed in Fig. 9 to seal the space between the threads 242 of the sleeve and the inclined surface 244 of the sleeve to prevent fluid from flowing axially of the bolt through the sleeve. The threads 242 of the sleeve 270 are compressed radially into surface engagement with the threads of the bolt in the manner illustrated in Fig. 6 when the device is moved to the locked position to seal the space between the sleeve and the bolt to prevent the axial flow of fluid along the bolt. The cooperating tapered driving and driven surfaces 236 and 244 of the nut 220 and sleeve 270 are moved into sealing engagement with each other in the manner illustrated in Fig. 6 when the assembly is moved to the locked position to seal the space between the sleeve and nut to prevent the axial flow of fluid therebetween.

Means may be provided to seal the space between the nut 220 and the surface of the member through which the bolt projects. One desirable form of such sealing means comprises suitable sealing material 280 projecting beneath its lower surface 248 of the nut 220 to engage the upper or supporting surface of a member through which the bolt projects. The nut assembly may be designed for a particular application in such a manner that the nut 220 moves axially relative to the sleeve 270 a sufficient distance when moved to the locked position to project the bottom of the seal 280 below the flange 246 of the sleeve 270 and into sealing engagement with the surface of the member being clamped. Considerable latitude of axial movement of the nut 220 on the bolt and sleeve is possible because the seal 280 can expand radially into a slot 282 formed in the lower end of the nut. If desired, new seals 280 may be inserted in the nut 220 when it is removed from the locked position on a bolt for reuse. The seal 280 securely seals the space between the bolt and the nut 220 to prevent the escape of fluid therebetween.

When the nut assembly is moved to the locked position the space between the bolt and nut and between the nut and the member engaged are thus securely sealed to prevent the flow of fluid in either direction.

It will be understood that single slots 272 and 274 extending in opposite directions can be formed in the sleeve, or pairs of slots as illustrated in Fig. 10 can be employed.

When the nut assembly illustrated in Figs. 9 and 10 is moved to the locked position on a bolt the angularly related surfaces of the threads of the locking sleeve engage the angularly related surfaces of the threads of the bolt in surface contact. Axial movement of the nut on the bolt is therefore prevented, and since no axial movement is permitted, vibration and shock cannot loosen the nut on the bolt.

I claim:

1. A locking nut assembly for a threaded member comprising a nut having a threaded segment adjacent one of its ends and a circular cylindrical axial bore adjacent its other end, a conical driving surface formed between said threads and axial bore, a threaded contractible member axially movable in the nut and having a conical driven surface adapted to be engaged by the conical driving surface of the nut, and a circular cylindrical axially extending member carried by the contractible member and frictionally engaging the walls of the cylindrical axial bore of the nut to maintain the contractible member assembled with the nut to rotate therewith, the contractible member and nut being so proportioned that the contractible member projects beneath the axial bore of the nut to engage a piece of work surrounding the threaded member to induce the contractable member to slide axially relative to the nut when the nut is rotated after the contractable member contacts the work to permit the conical driving surface of the nut to engage the conical driven surface of the contractible member to contract said member into engagement with the threaded member.

2. In a locking device for a threaded member a nut having a threaded segment at its top, a circular cylindrical axially extending bore at the bottom of the nut, a conical driving surface between the threaded segment and the axial bore, an inwardly extending shoulder between the conical driving surface and the threaded segment, an inwardly extending shoulder between said axial bore and the conical driving surface, a contractible locking sleeve having a circular cylindrical flange slidably mounted in said bore and frictionally engaging the walls of said bore to maintain the sleeve and nut assembled and to rotate the sleeve with the nut when initially applied to a threaded member, a conical driven surface positioned to be engaged and actuated by said conical driving surface to contract the sleeve into locking engagement with the threaded member when the nut moves axially on the sleeve, and an inwardly extending shoulder between said flange and the conical driven surface, the inwardly extending shoulder at the axially extending bore of the nut and the inwardly extending shoulder at the circular cylindrical flange of the sleeve being so related to the conical driving and driven surfaces that the shoulder of the sleeve will be spaced along the axis from the shoulder of the nut when the sleeve is tightened into locking engagement with the threaded member and the contractible locking sleeve being so proportioned that the inner end of the sleeve will be spaced axially from the shoulder between the conical driving surface and the threaded segment of the nut when the sleeve is tightened into locking engagement with the threaded member.

3. A sealing and locking nut assembly for a threaded bolt adapted to project through a member having a supporting surface comprising a sleeve having angularly related oppositely directed axially extending slots and internal threads to loosely engage the threads of the bolt, said sleeve being formed with a male conical driven surface and an axially extending circular cylindrical flange positioned radially outside of the conical driven surface, a nut having an internally threaded portion positioned adjacent one of its ends to loosely engage the threads of the bolt, the nut being formed with a female conical driving surface and an axially extending circular cylindrical bore positioned radially outside of the tapered driving surface and adjacent its other end whereby the flange of the sleeve may frictionally engage within the axially extending bore of the nut to maintain the nut and sleeve in assembled relation and to rotate the sleeve on the bolt into engagement with the supporting surface of said member, the flange of the sleeve projecting beneath the bore of the nut to engage the supporting surface and move the sleeve axially into the nut as the nut is rotated after said flange engages the supporting surface to move the conical driving and driven surfaces of the nut and sleeve into operative engagement to frictionally rotate the sleeve on the bolt to tighten the sleeve against the supporting surface and thereafter to compress the sleeve into clamping engagement with the threads of the bolt, the sleeve and nut being so proportioned that the threads of the sleeve may be contracted into clamping engagement with the threads of the bolt, and an axially extending seal carried by the nut to engage the supporting surface when the nut assembly is moved to the locked position.

4. In a locking device, axially movable nut and contractible sleeve members having axially spaced threaded segments, primary and secondary motion transmitting means between the nut and sleeve, the primary motion transmitting means including a cylindrical axial bore at the bottom of the nut and a portion having a circular cylindrical axial surface at the bottom of the contractible sleeve to frictionally engage the walls of the bore at the bottom of the nut to maintain the nut and sleeve in assembled relation and to rotate the sleeve onto a threaded member when the nut is rotated thereon, said portion of the sleeve having the cylindrical axial surface projecting beyond the axial bore of the nut to engage a piece of work surrounding the threaded member before the nut engages said piece of work, and the secondary motion transmitting means including an intermediate driving conical surface between the threaded segment and the axial bore of the nut, and a driven conical surface on the sleeve positioned above said cylindrical axial surface, the driving and driven conical surfaces of the nut and contractible sleeve being so proportioned that the threads of the sleeve may be contracted into clamping engagement with the threads of the threaded member by axial movement of the sleeve relative to the nut caused by rotation of the nut after the sleeve engages the work surrounding the threaded member.

5. A lock nut comprising a longitudinally split contractible threaded sleeve having an upper male conical driven surface and a lower axially extending circular cylindrical driven surface, a nut having a threaded portion at its top and intermediate and lower female conical and axially extending driving surfaces adapted to receive the contractible sleeve, the lower cylindrical driven surface of the contractible sleeve frictionally engaging the axially extending lower driving surface of the nut to maintain the sleeve and nut assembled to in effect provide a one-piece nut and to rotate the contractible sleeve onto a bolt into engagement with a supporting surface surrounding the bolt, the portion of the sleeve defining the lower cylindrical driven surface projecting beyond the lower axially extending driving surface of the nut to engage said supporting surface and move the sleeve axially into the nut to move the upper conical driven surface of the contractible sleeve into driving engagement with the intermediate female conical driving surface of the nut to first tighten the sleeve against the supporting surface and thereafter to compress the threads of the contractible sleeve into clamping engagement with the threads of the bolt when the nut is rotated after the sleeve engages the supporting surface.

RAYMOND J. MILLER.